United States Patent [19]

Blumstein et al.

[11] Patent Number: 5,104,948
[45] Date of Patent: Apr. 14, 1992

[54] SUBSTITUTED EXTENSIVELY CONJUGATED IONIC POLYACETYLENES

[75] Inventors: Alexandra Blumstein, Chelmsford; Sundar Subramanyam, Stoneham, both of Mass.

[73] Assignee: University of Lowell, Lowell, Mass.

[21] Appl. No.: 644,838

[22] Filed: Jan. 23, 1991

Related U.S. Application Data

[62] Division of Ser. No. 494,573, Mar. 16, 1990, Pat. No. 5,037,916.

[51] Int. Cl.$^5$ ............................................. C08F 4/26
[52] U.S. Cl. ...................... 526/90; 526/172; 526/185; 526/192; 526/194; 526/201; 526/204; 526/221; 526/225
[58] Field of Search ................ 526/265, 285, 90, 172, 526/185, 192, 194, 201, 204, 221, 225

[56] References Cited

U.S. PATENT DOCUMENTS

| | | | |
|---|---|---|---|
| 3,658,942 | 4/1972 | Kargin et al. | 260/875 |
| 4,204,216 | 5/1980 | Heeger et al. | 357/8 |
| 4,222,903 | 9/1980 | Heeger et al. | 252/518 |
| 4,269,238 | 5/1981 | Pez et al. | 252/500 |
| 4,395,497 | 7/1983 | Naarmann et al. | 523/135 |

FOREIGN PATENT DOCUMENTS 1202497 8/1970 United Kingdom .

OTHER PUBLICATIONS

V. A. Kabanov et al., *J. Macromol. Sci.-Chem.*, A9 (2):273–283 (1975).
K. V. Aliev et al., *Vysokomol. Soedin.*, 10, 1618 (1968).
V. A. Kabanov et al., *J. Appl. Polym. Sci.*, 19:1275–1281 (1975).
V. A. Kabonov et al., *Nuova Chimica*, 49(8):63–65 (1973).
A. R. Katrizky et al., *Helvetica Chimica Acta*, 67:939–946 (1984).
S. Subramanyam et al., *Macromolecules*, 24, 2668–2674 (1991).
V. A. Kabanov et al. (1968) Polymer Science USSR, 1873–1892 (English Transl. of Vysokemol. Soyed A10(7), 1618–1632 (1968).
Chem. Abstr. 91(26):211883g.
R. T. Morrison and R. N. Boyd, Organic Chemistry, 3rd Ed, p. 254 (1973).

*Primary Examiner*—Joseph L. Schofer
*Assistant Examiner*—M. Nagumo
*Attorney, Agent, or Firm*—Hamilton, Brook Smith & Reynolds

[57] ABSTRACT

A family of ionic polyacetylenes containing long sequences of conjugated double bonds in the backbone with ionic charges adjacent to or in conjugation with the backbone, and a synthetic process for preparing them, are disclosed. These polymers, which are soluble in many solvents including water, are mono- and di-substituted polyacetylenes that are extensively conjugated. The charge density and geometry of charge distribution depends on the number and nature of the substituents.

28 Claims, No Drawings

SUBSTITUTED EXTENSIVELY CONJUGATED IONIC POLYACETYLENES

GOVERNMENT SUPPORT

This invention was made with Government support under Grant DMR-8823084 awarded by the National Science Foundation. The Government has certain rights in this invention.

BACKGROUND

Polyacetylene have long been known as electrically conductive materials. They show a range of conductivities, ranging from insulators to quasi metal conductors. They have been used in energy storage devices, for example in construction of lightweight, solid batteries, and for energy conversion. However, polyacetylenes have several disadvantages which limit their applications. They are unstable, in particular to oxygen, and have poor solubility and poor processibility.

Substituted polyacetylene generally have no conductive properties. These polymers are typically used to manufacture permselective membranes for gas separation. They have improved stability toward oxygen in comparison to unsubstituted polyacetylene, but possess low levels of conjugation and poor processibility. Both unsubstituted and substituted polyacetylenes are difficult to prepare and their polymerization is often accompanied by the formation of undesirable cyclized by-products.

There is a need for electrically conductive, stable polyacetylenes that are oxygen-stable, processible and which can be synthesized without the formation of undesired by-products. Such materials would find extensive application in energy storage devices, in the manufacture of electrodes, as solid electrolytes, and as permselective membranes.

SUMMARY OF THE INVENTION

The present invention relates to a class of novel, highly conjugated acetylene polymers and a process for their preparation. These polymers are substituted, highly conjugated, charged acetylene polymers.

The present method involves providing acetylene monomers in which the acetylenic triple bond is either adjacent to or in conjunction with a quaternized charge-bearing heteroatom. This in turn can be obtained from either a quaternized heteroatom or a heteroatom capable of acting as a quaternizing agent. These quaternized acetylene monomers spontaneously polymerize to form highly conjugated, charged polyacetylenes.

In one embodiment of the method, an acetylenic moiety is reacted with a compound having a quaternizable heteroatom, resulting in the formation of an acetylenic monomer in which the triple bond is adjacent to the quaternized, charge-bearing atom. In this method, an acetylenic compound having the general formula:

wherein R is H, alkyl, alkoxy, aryl, aryloxy, trialkylsilyl, triarylsilyl, trialkoxysilyl, triaryloxysilyl, ester, thioester or nitrile group, and X is a halogen (e.g., Cl, Br, I) or other anion-forming substituent (e.g., CH₃SO₃, OTs, wherein Ts is tosylate), is combined with a compound having the general formula:

wherein Y is nitrogen (N), phosphorus (P) or arsenic (As). R' can be a trialkyl or a triaryl group (e.g., (CH₃)₃, (C₆H₅)₃, etc). or part of a heterocyclic ring (e.g., R'—Y—pyridine). The resulting intermediate polymerizes spontaneously to form a highly conjugated acetylene having the general formula:

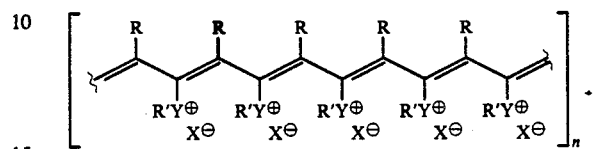

wherein n is an integer representing the number of repeating units in the polymer.

In another embodiment of the method, an acetylenic compound having the formula:

wherein R and X are as defined above, is reacted with a nitrogen- or phosphorus-containing compound capable of extensive charge delocalization upon quaternization, such as organic dyes, for example, phthalocyanine dye or methyl violet-B base.

In another embodiment of the present method, an acetylene monomer having a heteroatom susceptible to quaternization having the formula:

wherein R is as described above, is combined with a second compound having the general formula:

wherein R' and X are as described above. The resulting intermediate polymerizes spontaneously to form a highly conjugated, charged polyacetylene having the formula:

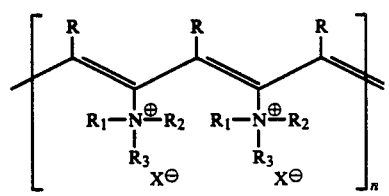

wherein R₁, R₂ and R₃ are used in place of R'. R₁, R₂ and R₃ are independently a H, alkyl group, aryl group or R₁ and R₂ together form a heterocyclic ring with N.

In another embodiment of the present method, an acetylenic monomer having the formula:

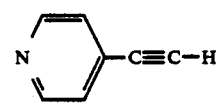

is reacted with a compound having the formula:

wherein R and X are as described above. The resulting intermediate polymerizes spontaneously to form a polyacetylene having the formula:

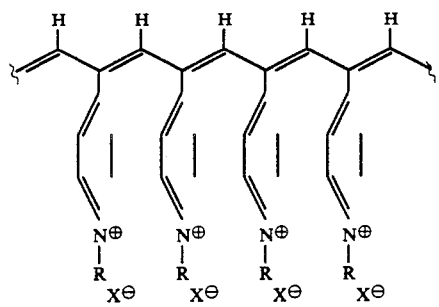

In another embodiment of the present method, a di-substituted acetylenic monomer, such as:

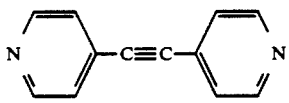

is combined with two equivalents of a compound having the formula:

wherein R and X are as defined above. The resulting intermediate polymerizes spontaneously to form a di-substituted polyacetylene having the formula:

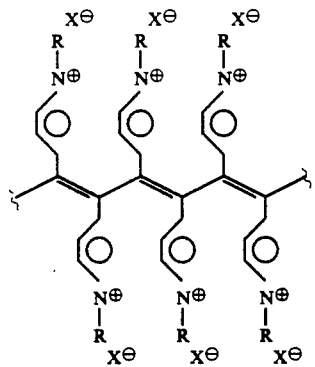

In another embodiment of the present method, the acetylene monomer is reacted with a metal salt. For example, an acetylenic monomer having the formula:

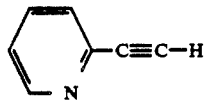

is combined with a metal salt having the formula:

wherein M is a metal selected from the group consisting of: Fe, Sn, Cu, Nb, W, Ta, Mo, Al, Ni, Pd, Si, Ge, Ti, V, Cr and Co. X is as described above and a and b are integers representing the number of atoms or groups in the formula. The resulting intermediate polymerizes spontaneously to form a polyacetylene having the formula:

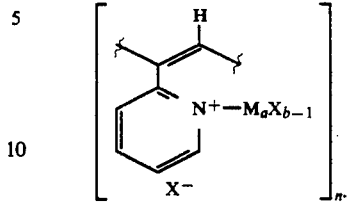

The present method provides polyacetylenes which have several unique features. For example, substituted, extensively conjugated polyacetylenes (having 10 or more double bonds in conjugation) can be synthesized using the method. The method can e utilized to prepare ionic polyacetylenes that have charges located in the $\alpha$-position to the polymer backbone. The present polyacetylenes are stable to oxygen, soluble in many common polymer organic solvents and water, and are easily processible.

The present polyacetylenes have many applications. For example, they can be used as permselective membranes and in energy storage devices. The conductivity of these polymers can be greatly increased by doping procedures and the resulting materials can be polymers utilized in applications requiring materials exhibiting semiconductivity and conductivity.

DETAILED DESCRIPTION OF THE INVENTION

The unique structure of the present highly conjugated, charged polyacetylenes relies on the spontaneous polymerization of acetylenic monomers possessing certain characteristics. Acetylenic monomers that are useful in synthesizing the present polymers are monomers in which the acetylenic triple bond is either directly attached to or in conjugation with a quaternized, charge-bearing heteroatom. These charge-bearing acetylenic monomers can be obtained by reacting an acetylenic compound that functions as a quaternizing agent with a second compound that has a quaternizable heteroatom, such as a nitrogen (N), phosphorus (P) or arsenic (As). Alternatively, an acetylenic compound that has a quaternizable heteroatom (N, P or As) either directly adjacent to or in conjugation with the triple bond is reacted with a second compound which is capable of quaternizing the heteroatom, i.e., a quaternizing agent. Acetylenic monomers that are particularly useful for these reactions include those containing tertiary aromatic, cycloaliphatic or aliphatic amines, phosphines or arsines in which the quaternizable atom is either directly adjacent to or in conjugation to the acetylenic triple bond. Examples of such monomers include 4-ethynylpyridine, 2-ethynylpyridine, 1,2-bis-4-pyridylacetylene, 1,2-bis-2-pyridylacetylene and 1,3-bis-4-pyridylbutadiyne. In addition to acetylenic monomers, polyacetylenic compounds such as acetylenic dimers, trimers or larger molecules containing multiple conjugated acetylenic triple bonds can be used. These polyacetylenic molecules must possess the characteristics described for the acetylenic monomers, that is, they must be capable of forming a quaternized intermediate with the quaternized heteroatom being directly adjacent to or in conjunction with the acetylenic triple bonds.

The second compound is referred to herein as the "quaternizing agent". The quaternizing agent is a compound that contains a functional group that is capable of forming an anion in the quaternized intermediate. Example of these include alkyl halides (Cl, Br, I), alkylsulfonates ($CH_3SO_3$, OTs, wherein Ts is tosylate (p-toluenemethaneulfonate) or metal salts ($FeCl_3$, $SnCl_4$, $CuCl_2$). Bromododecane and ethyl iodide are specific examples of alkyl halides that are useful as quaternizing agents. The quaternizing agent can also be a halogenated or a sulfonated macromolecule, for example, polyvinylchloride, polyvinylbromide or polyvinylsulfonate. In every case, the resulting quaternized acetylenic monomer polymerizes spontaneously to form highly conjugated, charged polyacetylenes. The quaternizing agent can also be a macromolecule that contains amino groups such as, for example, poly(vinylpyridine) or polypyrrole, which would quaternize by reacting with an acetylenic monomer having the formula:

wherein R and X are as defined above. The resulting quaternized intermediate polymerizes spontaneously to form a highly conjugated charged polymer having the formula:

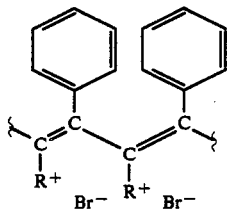

In one embodiment of the present invention, the present polymers can be made according to the following general procedure. An acetylenic compound having the general formula:

wherein R is H, an alkyl, alkoxy, aryl, aryloxy, trialkylsilyl, triarylsilys, trialkoxysilyl, triaryloxysilyl, ester, thioester or nitrile group (examples include alkyl groups having the general formula $C_mH_{2m+1}$, wherein $0 \leq m \leq 30$); and X is a halogen or a group capable of forming an anion. For example, X can be Cl, Br, I, $CH_3SO_3^-$ or $OTs^-$. The acetylenic compound is combined with a second compound having the general formula:

wherein Y is trisubstituted heteroatom, such as nitrogen (N), Phosphorus (P) or arsenic (As) and R' is a trialkyl group having the general mentioned above or a triaryl group. Examples include $(CH_3)_3$, $(C_6H_5)_3$, etc. Y can also be part of an aromatic ring structure, for example, R'—Y is pyridine. The resulting quaternized intermediate polymerizes spontaneously to form a highly conjugated, charged polyacetylene having the general formula:

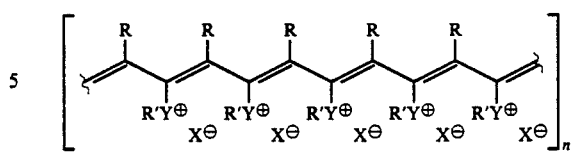

wherein n is an integer representing the number of repeating units in the polymer chain.

In another embodiment of the present method, an acetylenic compound having the formula:

wherein R is as described above, is combined with a compound having the general formula:

wherein R' and X are as described above. The resulting intermediate polymerizes spontaneously to form a highly conjugated, charged polyacetylene having the formula:

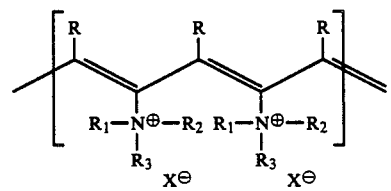

wherein $R_1$, $R_2$ and $R_3$ are used in place of R'. $R_1$, $R_2$ and $R_3$ are independently a H, alkyl group, aryl group or $R_1$ and $R_2$ together form a heterocyclic ring with N.

In another embodiment of the present method, an acetylene compound having the formula:

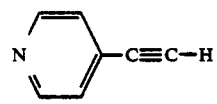

is reacted with a compound having the formula:

wherein R and X are as described above. The resulting intermediate polymerizes spontaneously to form a polyacetylene having the formula:

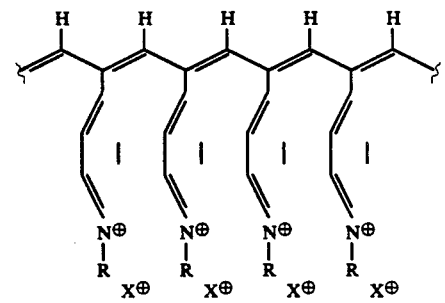

In another embodiment of the present method, one equivalent of a disubstituted acetylene compound, such as:

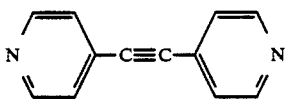

is combined with two equivalents of a compound having the formula:

R—X wherein R and X are as defined above. The resulting intermediate polymerizes spontaneously to form a disubstituted polyacetylene having the formula:

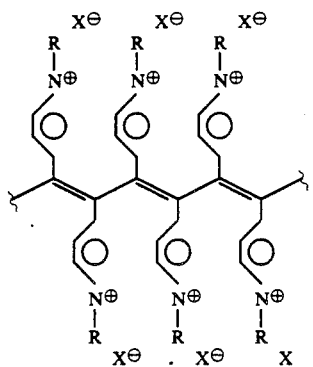

In another embodiment of the present method, a disubstituted diacetylenic compound having the structure:

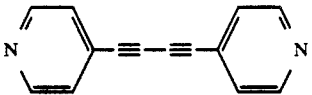

is reacted with two equivalents of a compound having the formula:

R—X wherein R and X are as defined previously. The resulting intermediate polymerizes spontaneously to form a disubstituted polyacetylene having the formula:

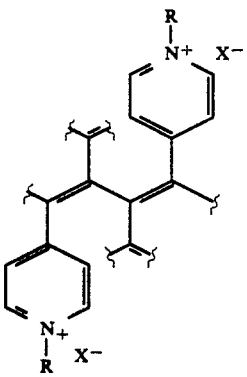

In another embodiment of the present method, the acetylenic monomer is reacted with a metal halide salt. For example, in this embodiment, an acetylenic monomer having the formula:

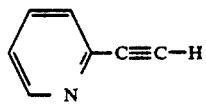

is combined with a metal halide salt having the formula:

$M_a$—$X_b$ wherein M is a metal, such as iron (Fe), tin (Sn), copper (Cu), niobium (Nb), tungsten (W), tantalum (Ta), molybdenum (Mo), aluminum (Al), nickel (Ni), palladium (Pd), silicon (Si), germanium (Ge), titanium (Ti), vanadium (V), chromium (Cr) and cobalt (Co), X is as described above, and wherein a and b are integers representing the number of each type of atom or group in the general formula. The resulting intermediate polymerizes spontaneously to form a polyacetylene having the formula:

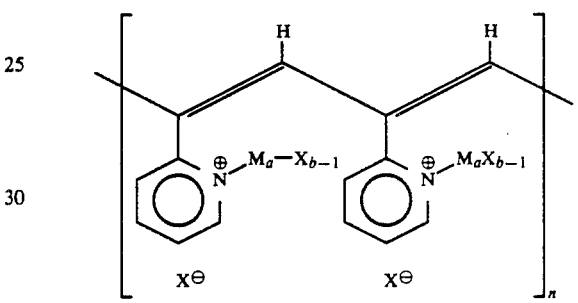

The present method is generally carried out as follows: the acetylene monomer is reacted with the quaternizing agent under conditions sufficient to cause the acetylene monomer to become quaternized. The reaction is carried out in an organic solvent. Solvents which are useful in the process are polar organic solvents such as methanol, ethanol, acetone, nitromethane, nitrobenzene, and acetonitrile. The reaction mixture containing the acetylenic monomer, quaternizing agent and, optionally, the solvent, is warmed to a temperature which causes quaternization of the acetylene monomer to occur. A preferred temperature range is from about −20° C. to about 100° C. The reaction mixture is held at this temperature for a time sufficient for spontaneous polymerization of the quaternized acetylene monomers to be completed. The polymer generally precipitates from the reaction mixture as a dark-colored solid. The polymer can then be filtered, washed or otherwise treated as desired.

The present polyacetylenes have several unique characteristics. They are extensively conjugated, (about 10 or more double bonds in conjugation). The present polyacetylenes have charges directly adjacent to or in conjugation with the polymer backbone, the present polymers have high charge densities (about 1-2 charges per repeating unit). Unique, extensively conjugated disubstituted polyacetylenes can be produced using the present method. The present polymers are soluble in common organic solvents (and in water for certain cases) and are easily processible.

The extent of substitution of the polyacetylenes depends upon the substituent groups present in the acetylenic monomer and the quaternizing agent. A wide variety of substituents is tolerated, including those leading to crosslinked structures. The present polymers can be co-polymerized or crosslinked with other polymers used as matrices such as polyvinyl halides, polyheterocyclic amines or polyvinylpyridines to form unique copolymer networks with extensively conjugated chains.

The present polyacetylene polymers are useful in several applications. For example, they can be cast as films and utilized as permselective membranes for gas separation. Due to the unique location of the charge semiconductive or conductive materials. These polyacetylenes can be doped with electron-donating dopants such as, for example, molecular iodine or bromine, $TCNQ^-$, $TCNQ^\circ/TCNQ^-$, $AsF_5$ or $SbF_5$ to afford electrically conducting materials. An example of the doping process is set out in detail in Example 7. The resulting doped polyacetylenes can be used as semiconductive materials.

The present invention will now be further illustrated by the following examples.

EXAMPLES

Materials and Methods

4-Ethynylpyridine and 1,4-bis-4-pyridylbutadiyne were synthesized by previously reported methods. L. D. Ciana et al., *J. Heterocyclic Chem.*, 21:607 (1984). 1,2-bis-4,4'-dipyridylacetylene was prepared by the method outlined by Ludi et al. M. Tanner et al., *Chimia*, 34:23 (1980). 2-Ethynylpyridine was obtained from Farchan Laboratories. Acetonitrile (HPLC grade) was obtained from VWR Scientific and was distilled under nitrogen before use. 1-Bromododecane and ethyl iodide were obtained from Aldrich Chemical Company.

Infrared spectra were recorded using KBr disks on a Perkin Elmer 1600 Series FT-IR spectrophotometer. UV-visible spectra were recorded on an IBM 9420 spectrometer using absolute ethanol as solvent. Viscosity measurements were made in absolute methanol using a Canon Ubbelohde dilution type viscometer.

EXAMPLE 1

Synthesis of Poly(4-N-dodecylpyridiniumbromide acetylene)

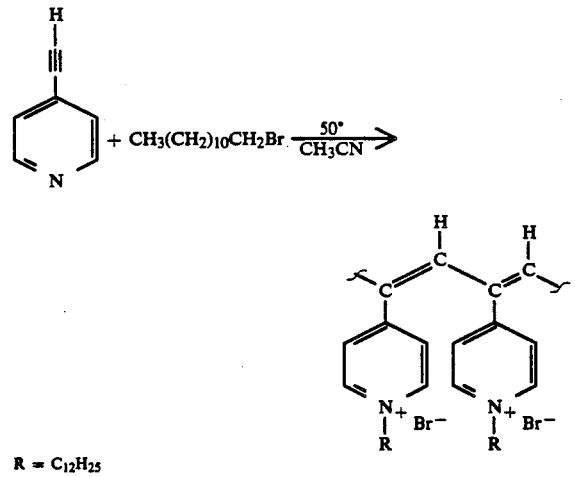

R = $C_{12}H_{25}$ 0.5 g ($4.85 \times 10^{-3}$ mol) of 4-ethynylpyridine was dissolved in freshly distilled acetonitrile (30 ml) and 1.21 g ($4.85 \times 10^{-3}$ mol) 1-bromododecane was added rapidly to the stirred solution. The reaction mixture was warmed to 50° C. and stirring was continued at this temperature for 72 hours. During this time the solution acquired a deep blue-black color and the polymeric product separated out as a black solid. It was filtered, reprecipitated from methanol with ethyl ether, and dried at 30° C. under vacuum. The yield was 1.21 g.

The product was a black powder and was readily soluble in ethanol, methanol and other polar organic solvents.

Elemental analysis showed that the product was a homopolymer of the quaternary ethynylpyridinium salt with 1-bromododecane (C=64.59%, H=8.17%, N=4.98%, Br=22.04%). The structure was confirmed by the infrared spectrum which showed characteristic absorption of bands of the pyridine ring (660, 754 $cm^{-1}$), and an intense band of the conjugated —C=C— bonds (1634 $cm^{-1}$). The bands corresponding to the —C≡C—H stretch (3218 $cm^{-1}$) and the —C≡C— stretch (2098 $cm^{-1}$) of the ethynyl group were absent in the product. The polymer also exhibited an absorption in the visible region of the UV spectrum ($\lambda_{max}$=599 nm, $\epsilon_{max}$=8.2×10$^4$), which supports the conjugated structure.

The inherent viscosity measured in absolute methanol solution at 20° C. was 0.91 dl/g.

EXAMPLE 2

Synthesis of Poly(2-N-ethylpyridiniumiodideacetylene)

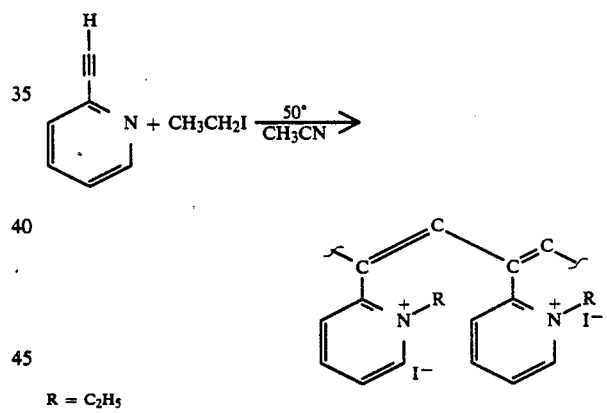

R = $C_2H_5$ 0.5 g ($4.85 \times 10^{-3}$ mol) of 2-ethynylpyridine was dissolved in freshly distilled acetonitrile and 0.76 g ($4.85 \times 10^{-3}$ mol) of ethyl iodide was added rapidly to the stirred solution. The reaction was run in an identical manner to that described in Example 1. The deep purple-black solid obtained after workup was dried at 30° C. under vacuum. The yield was 0.68 g. The product was readily soluble in ethanol, methanol and other polar organic solvents.

Elemental analysis showed the product to be a homopolymer of the quaternary ethynylpyridinium salt with ethyl iodide (C=51.68%, H=4.36%, N=7.74%, I=35.99%).

The infrared spectrum of the polymer showed characteristic absorption bands of the pyridine ring (641, 746 $cm^{-1}$), and an intense band of the conjugated —C=C— bonds (1621 $cm^{-1}$). The bands corresponding to the —C≡C—H (3130 $cm^{-1}$) and —C≡C— (2098 $cm^{-1}$) of the ethynyl group were absent in the product. The polymer also exhibited an absorption in the visible region of the UV spectrum ($\lambda_{max}=433$ nm, $\epsilon_{max}=1.4\times 10^5$), which is indicative of extensive conjugation.

The inherent viscosity measured in absolute methanol solution at 20° C. was 0.90 dl/g.

EXAMPLE 3

Synthesis of Poly(1,2-bis-4-N-dodecylpyridiniumbromide acetylene)

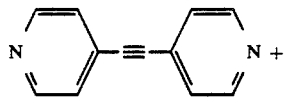

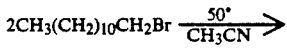

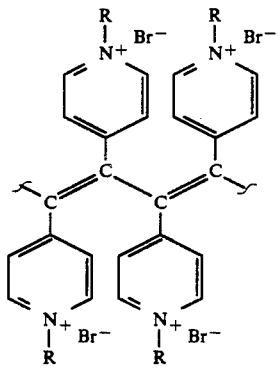

R = $C_{12}H_{25}$ 0.05 g ($2.8\times 10^{-3}$ mol) of 1,2-bis-4pyridylacetylene was dissolved in freshly distilled acetonitrile (30 ml) and 0.69 g ($5.6\times 10^{-3}$ mol) of 1-bromododecane was added rapidly to the stirred solution. The reaction was carried out in an identical manner to that described in Example 1. The black solid obtained after workup was dried at 30° C. under vacuum. The yield of poly-(1,2-bis-4-N-dodecylpyridinium bromide) acetylene was 1.12 g. The product was readily soluble in ethanol, methanol and polar organic solvents.

Elemental analysis showed the product to be a homopolymer of the diquaternary salt of 1,2-bis-4-pyridiniumacetylene with dodecylbromide (C=64.62%, H=7.92%, N=6.34%, Br=18.84%).

The infrared spectrum of the polymer showed characteristic absorption bands of the pyridine ring (660, 755 cm$^{-1}$) and an intense band of the conjugated —C=C— bonds (1635 cm$^{-1}$). The band corresponding to the —C≡C— bond (1936 cm$^{-1}$) in the dipyridylacetylene was absent in the product. The polymer also exhibited an absorption in the visible range of the UV spectrum ($\lambda_{max}=450$ nm, $\epsilon_{max}=2.2\times 10^5$), indicative of extensive conjugation.

The inherent viscosity measured in absolute methanol at 28° C. was 0.93 dl/g.

EXAMPLE 4

Synthesis of Polypyridiniumbromideacetylene

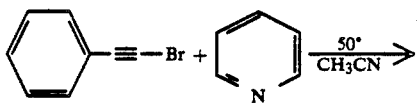

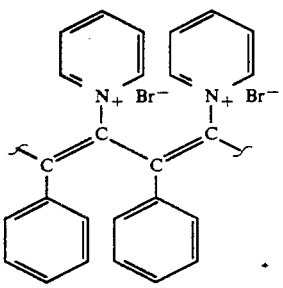

0.5 g ($2.8\times 10^{-3}$ mol) of α-bromophenylacetylene was dissolved in freshly distilled acetonitrile (30 ml) and 0.22 g ($2.8\times 10^{-3}$ mol) of dry pyridine was added rapidly to the stirred solution. The reaction was carried out in a manner identical to that described in Example 1. The dark brown solid obtained after workup was dried at 30° C. under vacuum. The yield of poly(pyridiniumbromide-acetylene) was 0.52 g. The polymer was soluble in ethanol, methanol and polar organic solvents.

Elemental analysis showed the product to be a homopolymer of the quaternary pyridinium salt of α-bromophenylacetylene (C=55.60%, H=3.54%, N=3.48%, Br=32.86%).

The infrared spectrum of the polymer showed characteristic absorption bands of the pyridine ring (689, 755 cm$^{-1}$) and an intense band of the conjugated —C=C— bonds (1585 cm$^{-1}$). The polymer also exhibited an absorption in the visible region of the UV spectrum ($\lambda_{max}=401$ nm, $\epsilon_{max}=1.69\times 10^{-3}$), indicative of conjugation.

EXAMPLE 5

Synthesis of Poly(1,3-bis-4-N-dodecylpyridiniumbromide acetylene)

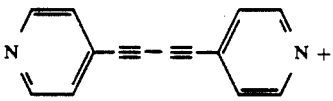

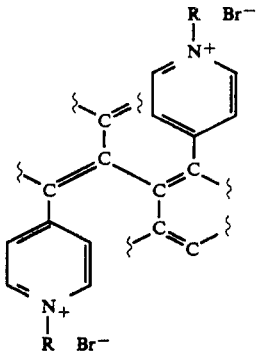

R = $C_{12}H_{25}$ 0.1 g ($4.9\times 10^{-4}$ mol) of 1,3-bis-4-pyridylbutadiyne was dissolved in freshly distilled acetonitrile (30 ml) and 0.244 g ($9.8\times 10^{-4}$ mol) of 1-bromododecane was added rapidly to the stirred solution. The reaction was carried out in a manner identical to that described in example 1. The product obtained as a black powder was dried at 30° C. under vacuum. The yield poly-(1,3-bis (4-N-dodecylpyridiniumbromide) acetylene was 0.22 g. The polymer was found to be highly insoluble, indicating extensive crosslinking.

EXAMPLE 6

Synthesis of Poly(2-N-iron(III)dichloridepyridinium-chlorideacetylene)

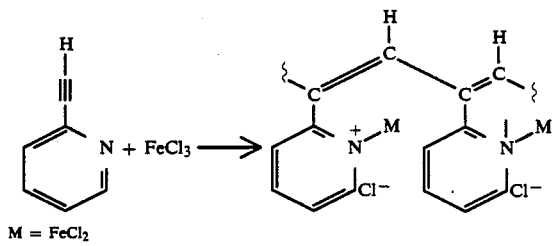

M = FeCl$_2$ 1.57 g (9.7×10$^{-3}$ mol) of anhydrous ferric chloride was dissolved in dry methanol (25 ml). The solution was stirred under dry nitrogen and cooled to 0° C. 0.05 g (4.85×10$^{-3}$ mol) of 2-ethynylpyridine dissolved in dry methanol (5 ml) was added rapidly to the stirred solution. The temperature of the reaction mixture was maintained at 0° C. for one hour after which it was allowed to warm to 25° C. Stirring was continued for 48 hours during which time the polymer precipitated as a black solid. The product was filtered, washed several time with methanol and dried at 30° C. under vacuum to yield a black powder. The yield was 0.68 g.

The polymer was highly soluble in water and had poor solubility in organic solvents.

The polymer exhibited an absorption in the visible region of the UV spectrum ($\lambda_{max}$=532 nm, $E_{max}$=1.58×10$^5$), indicating extensive conjugation.

EXAMPLE 7

Doping of Poly(1,2-bisdodecylpyridiniumbromideacetylene)

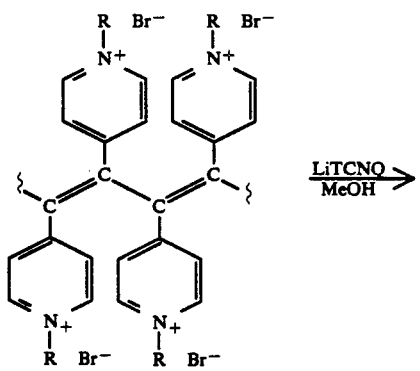

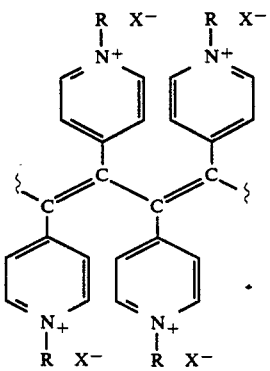

R = C$_{12}$H$_{25}$
X = TCNQ 0.1 g of poly(1,2-bisdodecylpyridiniumbromide-acetylene) was dissolved in dry methanol (25 ml) and 0.07 g (3.26×10$^{-4}$ mol) of lithiumtetracyanoquinodimethane (LiTCNQ) dissolved in methanol (25 ml) was added rapidly to the stirred solution. The deep purple solution was warmed to 50° C. and stirred for 72 hours. The solvent was then evaporated to yield a lustrous blue-black solid. This was washed several times with water and dried in a vacuum. The yield was 0.6 g.

The infrared spectrum of the polymer showed two intense bands of the cyano groups in TCNQ (2181, 2134 cm$^{-1}$) in addition to the intense band of the conjugated —C≡C— bands (1639 cm$^{-1}$). The polymer also exhibited an absorption in the visible region of the UV spectrum ($\lambda_{max}$=438 nm) indicative of conjugation.

The stoichiometry of the dopant may be varied by using different mole ratios of LiTCNQ in the above reaction. Complex salts may be prepared by using LiTCNQ with neutral TCNQ in the doping process described above.

EXAMPLE 8

Synthesis of Poly(methylviolet-B-bromidephenylacetylene)

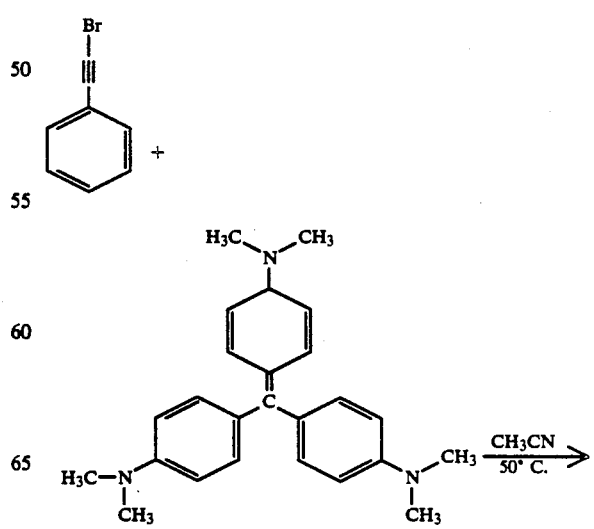

-continued

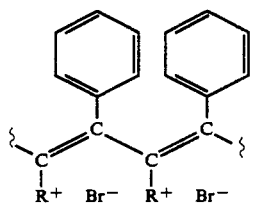

R = methyl violet - B 0.5 g (2.8×10⁻³ mmol) of α-bromophenylacetylene was dissolved in anhydrous acetonitrile (25 ml). 1.0 g (2.8×10⁻³ mmol) of methylviolet-B base (Aldrich) dissolved in acetonitrile (15 ml) was added rapidly to the stirred solution. The reaction mixture was warmed to 50° C. and the stirring was continued for 72 hours. The product precipitated as a dark solid. This was filtered, washed several times with acetonitrile and dried in vacuum at 30° C. The yield of the lustrous blue-black title compound was 1.2 g.

The polymer exhibited an absorption in the visible region of the UV spectrum ($\lambda_{max}$=584 nm), indicative of extensive conjugation.

Equivalents

Those skilled in the art will recognize, or be able to ascertain, using no more than routine experimentation, equivalents to the specific embodiments of the invention described herein. Such equivalents are intended to be encompassed in the scope of the following claims.

We claim:

1. A method of preparing a conjugated polyacetylene comprising reacting a compound containing a quaternizable heteroatom with a compound that functions as a quaternizing agent, wherein one of the compounds is an acetylenic monomer having a carbon-carbon triple bond, under conditions sufficient to form a quaternized acetylene monomer having an acetylenic triple bond that is directly attached to the heteroatom or that is conjugated with the heteroatom through a sequence of conjugated carbon-carbon double bonds, whereby the carbon-carbon triple bond on the quaternized acetylene monomer spontaneously polymerizes to form the conjugated polyacetylene.

2. A method of claim 1 wherein the heteroatom is selected from the group consisting of: nitrogen (N), phosphorus (P) and arsenic (As).

3. A method of claim 1 wherein the quaternized acetylenic monomer is produced by reacting an acetylenic compound with a quaternizing agent under conditions sufficient for quaternization to occur.

4. A method of claim 3 wherein the quaternizing agent is selected from the group consisting of alkyl halides, alkyl sulfonates and metal halides.

5. A method of claim 3 wherein the quaternizing agent is a halo-metallo-phthalocyanine selected from the group consisting of: di-chloro-silicon-phthalo-cyanine, di-chloro-tin-phthalocyanine and iron-chlorophthalocyanine.

6. A method of claim 4 wherein the quaternizing agent is a macromolecule.

7. A method of claim 6 wherein the macromolecule is selected from the group consisting of: poly(vinyl chloride), poly(vinylbromide), poly(vinylsulfonate) and poly(styrenesulfonate).

8. A method of claim 4 wherein the quaternizing agent is selected from the group consisting of: 1-bromododecane, ethyliodide, 1-heptylmethane sulfonate and heptyl-1,7-bis-methanesulfonate.

9. A method of claim 1 wherein a polyacetylene compound is used in lieu of the acetylene monomer.

10. A method of claim 9 wherein the polyacetylene compound is 1,4-bis-4-pyridylbutadiyne.

11. A method of claim 1 wherein the acetylene monomer is selected from the group consisting of: 2-ethynylpyridine, 4-ethynylpyridine, 1,2-bis-4-pyridylacetylene, α-bromophenylacetylene and 1,4-bis-4-pyridylbutadiyne.

12. A method for preparing conjugated polyacetylene comprising:
a) reacting an acetylene monomer having the formula:

$$R-C\equiv C-X$$

wherein R is selected from the group consisting of: H, alkyl, alkoxy, alkylthio, trialkylsilyl, trialkyloxysilyl, aryl, aryloxy, arylthio, triarylsilyl, triaryloxysilyl, ester and thioester groups; and X is an atom or group of atoms capable of forming an anion, with a quaternizing agent having the formula:

$$R'-Y$$

where R' is an alkyl or aryl group and Y is a heteroatom which is part of a cyclic, heterocyclic or heterocyclicaromatic compound which is susceptible to quaternization, under conditions sufficient for quaternization of the heteroatom to occur, thereby forming a quaternized acetylene intermediate; and
b) maintaining the reaction under conditions sufficient for spontaneous polymerization of the quaternized acetylene intermediate to occur.

13. A method of claim 12 wherein the acetylene monomer is α-bromophenylacetylene.

14. A method of claim 12 wherein the quaternizing agent is pyridine.

15. A method of claim 12 wherein the quaternizing agent has a structure capable of delocalizing a charge resulting from quaternization.

16. A method of claim 15 wherein the quaternizing agent is an organic dye selected from the group consisting of: phthalocyanine dyes and methylviolet dyes.

17. A method of claim 12 wherein the quaternizing agent is a polymer containing quaternizable heteroatoms selected from the group consisting of: N, P and As.

18. A method of claim 17 wherein the quaternizing agent is poly(vinylpyridine) or poly(pyrrole).

19. A method for preparing a conjugated polyacetylene comprising:
a) reacting an acetylene monomer having a conjugated nitrogen atom susceptible to quaternization with a quaternizing agent having the formula:

$$R'-X$$

wherein R' is an alkyl or aryl group and X is an atom or a group of atoms capable of forming an anion, under conditions sufficient for quaternization of the nitrogen atom to occur thereby forming a quaternized intermediate; and
b) maintaining the reaction under conditions sufficient for spontaneous polymerization of the quaternized intermediate to occur.

20. A method of claim 19 wherein the acetylene monomer is p-ethynylpyidine.

21. A method of claim 19 wherein the quaternizing agent is ethyliodide, 1-bnromododecane or heptylmethanesulfonate.

22. A method for preparing a conjugated polyacetylene comprising:
   a) reacting 1,2-bis-4'-pyridylacetylene with one or two equivalents of a quaternizing agent having the formula:

R—X wherein R is an alkyl group, an aryl group or a macromolecule and X is an atom or a group of atoms capable of forming an anion, under conditions sufficient for quaternization of the nitrogen atom to occur thereby forming a quaternized intermediate; and
   b) maintaining the reaction under conditions sufficient for spontaneous polymerization of the quaternized intermediate to occur.

23. A method of claim 22 wherein 1,2-bis-2'-pyridylacetyne is used in lieu of 1,2-bis-4'-pyridylacetylene.

24. A method of claim 22 wherein the quaternizing agent is selected from the group consisting of: ethyliodide, 1-bromododecane and heptylmethane sulfonate.

25. A method for preparing conjugated polyacetylenes comprising:
   a) reacting an acetylene monomer having a nitrogen, phosphorous or arsenic atom susceptible to quaternization with a metal halide having the formula:

$M_a$—$X_b$ wherein M is a metal atom, X is an atom or a group of atoms capable of forming an anion, and a and b are integers representing the number of each atoms or groups of atoms in the formula; under conditions sufficient for quaternization of the nitrogen atom to occur, thereby forming a quaternized intermediate; and
   b) maintaining the reaction under conditions sufficient for spontaneous polymerization of the quaternized intermediate to occur.

26. A method of claim 25 wherein M is selected from the group consisting of: Fe, Sn, Cu, Nb, W, Ta, Mo, Al, Ni, Pd, Si, Ge, Ti, V, Cr and Co.

27. A method of claim 25 wherein X is selected from the group consisting of: F, I, Br and Cl.

28. A method of claim 25 wherein the metal halide is selected from the group consisting of: $FeCl_3$, $SnCl_4$, $CuCl_2$, $NiCl_2$, $AlRCl_2$, $AlR_2Cl$, and $R_3SiCl$, wherein R is an alkyl group selected from the group consisting of methyl, ethyl, propyl and butyl.

* * * * *

UNITED STATES PATENT AND TRADEMARK OFFICE
CERTIFICATE OF CORRECTION

PATENT NO.  :  5,104,948
DATED       :  April 14, 1992
INVENTOR(S) :  Alexandre Blumstein, Sundar Subramanyam It is certified that error appears in the above-identified patent and that said Letters Patent is hereby corrected as shown below:

Title page, item (75), Inventors, cancel "Alexandra Blumstein" and insert therefor --Alexandre Blumstein--;

Claim 20, column 17, line 2, cancel "p-ethynylpyidine" and insert therefor --p-ethynylpyridine--;

Claim 21, column 17, line 2, cancel "1-bnromododecane" and insert therefor --1-bromododecane--.

Signed and Sealed this

Sixth Day of July, 1993

Attest:

MICHAEL K. KIRK

Attesting Officer      Acting Commissioner of Patents and Trademarks